(12) United States Patent
Komuro et al.

(10) Patent No.: US 8,358,040 B2
(45) Date of Patent: *Jan. 22, 2013

(54) PERMANENT MAGNET TYPE ELECTRIC ROTATING MACHINE

(75) Inventors: Matahiro Komuro, Hitachi (JP); Yuichi Satsu, Hitachi (JP); Haruo Koharagi, Hitachi (JP); Yuji Enomoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1455 days.

This patent is subject to a terminal disclaimer.

(21) Appl. No.: 11/356,096

(22) Filed: Feb. 17, 2006

(65) Prior Publication Data

US 2006/0191601 A1 Aug. 31, 2006

(30) Foreign Application Priority Data

Feb. 25, 2005 (JP) ................................. 2005-049918

(51) Int. Cl.
H02K 33/02 (2006.01)

(52) U.S. Cl. ................... 310/12.24; 310/10; 310/12.21

(58) Field of Classification Search .................. None
See application file for complete search history.

(56) References Cited

U.S. PATENT DOCUMENTS

| | | | | |
|---|---|---|---|---|
| 4,865,915 A | * | 9/1989 | Okonogi et al. | 428/336 |
| 5,069,713 A | * | 12/1991 | Harris et al. | 75/232 |
| 6,281,774 B1 | * | 8/2001 | Nishiuchi et al. | 335/302 |
| 6,387,293 B1 | * | 5/2002 | Akioka et al. | 252/62.54 |
| 6,441,523 B1 | | 8/2002 | Koharagi et al. | |
| 6,511,552 B1 | | 1/2003 | Makita et al. | |
| 6,596,096 B2 | * | 7/2003 | Carl et al. | 148/101 |
| 6,821,357 B2 | | 11/2004 | Makita et al. | |
| 7,025,837 B2 | | 4/2006 | Makita et al. | |
| 2002/0063492 A1 | * | 5/2002 | Scott | 310/261 |
| 2002/0135260 A1 | * | 9/2002 | Petersen | 310/216 |
| 2003/0196730 A1 | * | 10/2003 | Carl et al. | 148/301 |
| 2005/0012427 A1 | * | 1/2005 | Seki et al. | 310/257 |
| 2005/0081959 A1 | * | 4/2005 | Kim et al. | 148/105 |
| 2006/0022175 A1 | * | 2/2006 | Komuro et al. | 252/500 |
| 2007/0071979 A1 | * | 3/2007 | Komuro et al. | 428/403 |
| 2007/0144615 A1 | * | 6/2007 | Komuro et al. | 148/105 |
| 2008/0054738 A1 | * | 3/2008 | Komuro et al. | 310/46 |
| 2008/0241513 A1 | * | 10/2008 | Komuro et al. | 428/328 |

FOREIGN PATENT DOCUMENTS

| | | |
|---|---|---|
| CN | 2321160 | 5/1999 |
| CN | 1234589 | 11/1999 |
| JP | 62-188757 | * 8/1987 |
| JP | 10-163055 | 6/1998 |
| JP | 11-016727 | 1/1999 |
| JP | 2000-357606 | 12/2000 |
| JP | 2001-157491 | 6/2001 |
| JP | 2004-153924 | 5/2004 |

* cited by examiner

*Primary Examiner* — John Sheehan (74) *Attorney, Agent, or Firm* — Antonelli, Terry, Stout & Kraus, LLP.

(57) ABSTRACT

A permanent magnet type electric rotating machine having a high resistance permanent magnet used for the electric rotating machine, the permanent magnet containing a magnetic powder and a fluorine compound, in which the current waveform is controlled for reducing the loss to satisfy a relation: A<C<B and restrict the 7th higher-harmonic component to 20% or less where A is the content for the 5th higher harmonic component, B is the content for the 7th higher harmonic component, and C is the content for the 11th higher harmonic component, assuming the total of contents for the fundamental components of a current supplied to the findings being 100%.

17 Claims, 6 Drawing Sheets

PERMANENT MAGNET TYPE ELECTRIC ROTATING MACHINE

CLAIM OF PRIORITY

The present application claims priority from Japanese application serial No. 2005-49918, filed on Feb. 25, 2005, the content of which is hereby incorporated by reference into this application.

FIELD OF THE INVENTION

The present invention concerns a permanent magnet type electric rotating machine.

BACKGROUND OF THE INVENTION

An existent example of a electric rotating machine is disclosed in Japanese Patent Laid-Open No. 2004-153924 (hereinafter referred to as Patent Document 1). The Patent Document 1 describes a electric rotating machine having a permanent magnet in a rotor.

A further improvement for the efficiency is demanded in the electric rotating machine described in the Patent document 1. The invention intends to provide a highly efficient permanent magnet type electric rotating machine.

SUMMARY OF THE INVENTION

According to the present invention, a permanent magnet type electric rotating machine is provided wherein the machine includes a stator core wound with coils, and a rotor having a permanent magnet and rotatably supported to the stator core, the permanent magnet containing a magnetic powder and a fluorine compound.

DETAILED DESCRIPTION OF THE PREFERRED EMBODIMENTS

According to the first aspect of the invention, eddy current loss in the permanent magnet of the permanent magnet type electric rotating machine can be decreased to provide a permanent magnetic type electric rotating machine of high efficiency.

According to a second aspect of the present invention, a high speed permanent magnet type electric rotating machine includes: a permanent magnet type synchronous motor having a stator with armature windings being wound in a plurality of slots of a stator core, a permanent magnet containing a fluorine compound of high resistance, and a rotor having a reinforcing member disposed to the outer periphery thereof; and an inverter for driving the permanent magnet type synchronous motor, in which the total contents of higher harmonic current components of current supplied from the inverter to the permanent magnet type electric rotating machine is controlled so that the 7th content B is 20% or less of the total content, and a relation A<C<B is satisfied, assuming the total of the fundamental wave components being 100%, wherein the 5th content is A, the 7th content B and the 11th content C.

According to third aspect of a permanent magnet type synchronous motor including a stator with armature windings being wound in a plurality of slots of a stator core, a permanent magnet of high resistance at an outer periphery of a conductive and magnetic shaft, and a rotor having a reinforcing member disposed to the outside thereof, in which the total content of the harmonic wave components of current supplied from the inverter for driving the permanent magnet type synchronous motor is controlled so that the content calculated as $(A^2+B^2+C^2+D^2+E^2+F^2)^{0.5}$ is 20% or less of the total content, assuming the fundamental wave being as 100%. the 5th content A, wherein the 7th content is B, the 11th content C, the 13th content D, the 17th content E, and the 19th content F.

Further, a high resistance layer comprising a fluorine-containing inorganic compound is adopted for the permanent magnet of high resistance thereby reducing the loss in the magnet portion due to the higher harmonic current.

Further, a fluorine-compound is formed as a layer to the permanent magnet of high resistance and since the fluorine compound has higher resistance than that of the matrix of the permanent magnet and is stable at a curie temperature of the matrix or lower, it gives rise to no problems even when the temperature of the electric rotating machine rises locally.

Magnetic fluxes of the permanent magnet are introduced by way of a rotor shaft, CFRP or high strength member to the stator. When the permanent magnet type electric rotating machine is driven by an inverter at a fundamental frequency of several hundreds Hz or higher, higher harmonic magnetic fluxes are generated from the inverter. Potential order of higher harmonics is 5 times, 7 times, 11 times, 13 times, 17 times, and 19 times the fundamental frequency to generate higher harmonic loss in each of the constituent materials. The higher harmonic loss amounts to several kW in the shaft in which a high speed permanent magnet type electric rotating machine is no more valid. For solving the subject, a high resistance magnet is adopted for the permanent magnet. The high resistance magnet includes a layer of a fluoro-containing compound and the magnet has, at the inside or the surface thereof, with a fluoro-containing layer described as $BaF_2$, $CaF_2$, $MgF_2$, $SrF_2$, $LiF$, $LaF_3$, $NdF_3$, $PrF_3$, $SmF_3$, $EuF_3$, $GdF_3$, $TbF_3$, $DyF_3$, $CeF_3$, $HoF_3$, $ErF_3$, $TmF_3$, $YbF_3$, $LuF_3$, $LaF_2$, $NbF_2$, $PrF_2$, $SmF_2$, $EuF_2$, $GdF_2$, $TbF_2$, $DyF_2$, $CeF_2$, $HoF_2$, $ErF_2$, $TmF_2$, $YbF_2$, $LuF_2$, $YF_3$, $ScF_3$, $CrF_3$, $MnF_2$, $MnF_3$, $FeF_2$, $FeF_3$, $CoF_2$, $CoF_3$, $NiF_2$, $ZnF_2$, $AgF$, $PbF_4$, $AlF_3$, $GaF_3$, $SnF_2$, $SnF_4$, $InF_3$, $PbF_2$, $BiF_3$, or MxFy in which M is an element having an atomic number from 12 to 90, x is from 1 to 5 and y is from 0.1 to 10, or a layer in which MxFy is mixed with a light element such as oxygen, carbon, boron, or nitrogen at a concentration of 10 atom % or less. The fluorine compound may also be incorporated with an impurity or defect such as oxygen, carbon or nitrogen within a range not changing the crystal structure. This may be a mixture of an oxide and a fluorine compound, a mixture of a carbide and a fluorine compound or a mixture of a nitride and a fluorine compound as a mixture of the impurity compound and the fluorine compound. Further, this may be a layer of a plurality of fluorine compounds. While the layered fluorine compound layer has a resistivity of 10 mΩcm or higher, an effect of reducing the loss is recognized so long as the resistance is twice or more the resistance of the matrix. Further, the thickness of the layered fluorine compound is from 1 to 10,000 nm. In a case of forming the layered fluorine compound by way of a coating layer, the size of the fluorine compound grains in the layered fluorine compound is 100 nm or less. Also in a case where a hetero-phase exhibiting the resistance twice or more of the matrix is present in addition to the fluorine compound described above in the layered fluorine compound, the effect of reducing the loss is recognized. The magnet as the matrix comprises an alloy series containing rare earth elements and ferromagnetic transition metals such as NdFeB series, SmCo series or SmFeN series. A permanent magnet electric rotating machine reduced for the loss can be provided by adopting the high resistance magnet as described above, inserting a reactor between the inverter and the permanent magnet type electric rotating machine and controlling the content of higher harmonic current component supplied from the inverter to the permanent magnet type electric rotating machine for the 5th content A, the 7th content B, and the 11th content C, such that the 7th content is 20% or less and a relation: A<C<B is satisfied assuming the fundamental wave component being as 100. Further, higher harmonic loss in the high resistance magnet portion of the shaft can be decreased by disposing a ring of an electromagnetic steel sheet or powder magnetic core to the outer periphery for the shaft of the rotor for the permanent magnet electric rotating machine, inserting a reactor between an inverter and a permanent magnet type electric rotating machine, and controlling the content of higher harmonic current component supplied from the inverter to the permanent magnet type electric rotating machine for the 5th content A, the 7th content B, the 11th content C, the 13th content D, the 17th content E, and the 19th content F so as to satisfy the total content of 21% or less is satisfied when calculated as $(A^2+B^2+C^2+D^2+E^2+F^2)^{0.5}$, assuming the fundamental wave component being as 100%.

In the embodiment of the invention, the layered fluorine compound is formed to the inside or the surface of a rare earth permanent magnet of high resistance and, particularly, a fluorine compound is formed on the surface of the material containing the rare earth element in the permanent magnet, thereby ensuring the high resistance and the corrosion resistance. When a material containing a fluorine compound containing a rare earth element or one or more of elements having an atomic number of 12 to 90 and fluorine is formed, the outside of the fluorine compound is not limited particularly but may be a metal or alloy film such as Ni, Cr or Cu, an oxide film such as $SiO_2$ or $Al_2O_3$, a nitride film such as TiN, or an organic material such as epoxy. This embodiment provides a magnet motor capable of reducing the loss by restricting the reduction of the energy product and increasing the resistance of a rare earth element-containing R—Fe—B series (R: rare earth element) or R—Co series magnet and using the magnet for the rotor. The magnet motor includes those for use in driving of hybrid automobiles, for use in startors, and for use in electric power steerings, and also includes high speed motors for centrifugal separators, cleaners, motors, generators, and spindles.

Figure 1:
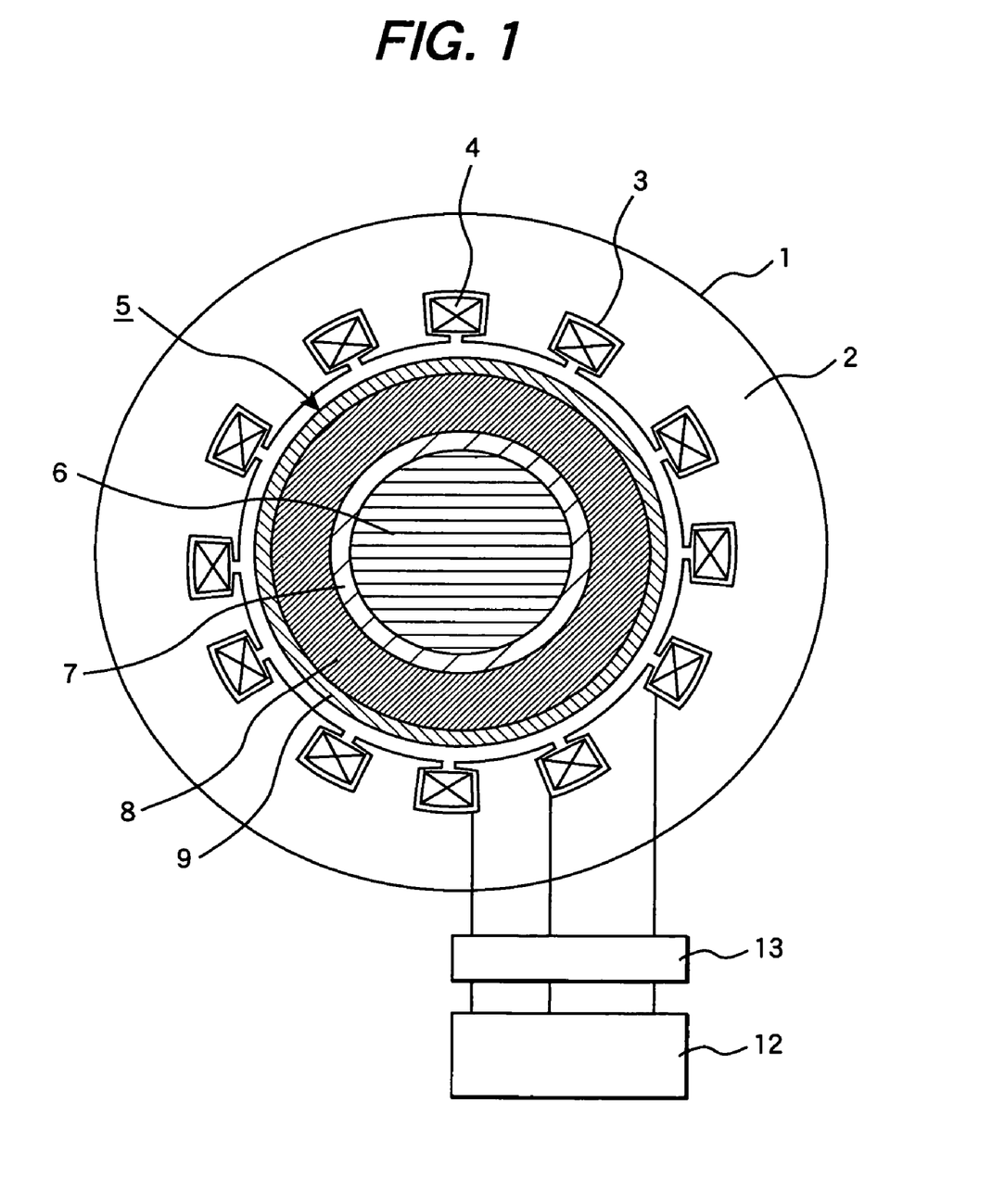
FIG. 1 is a radial cross sectional view of a permanent magnet type electric rotating machine according to an embodiment of the invention.
Figure 2:
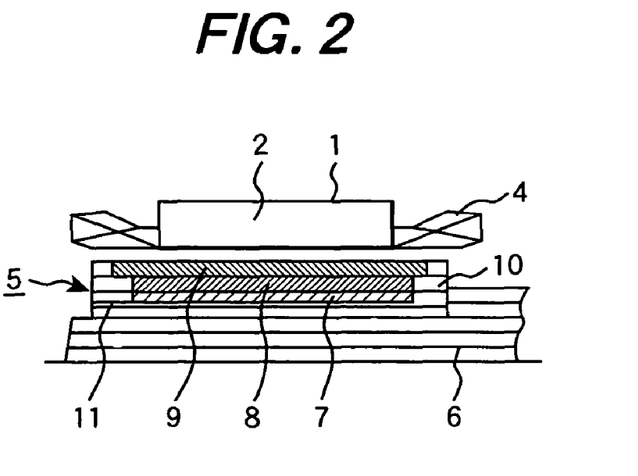
FIG. 2 is an axial cross sectional view of a permanent magnet type electric rotating machine according to the embodiment of the invention.
Figure 3:
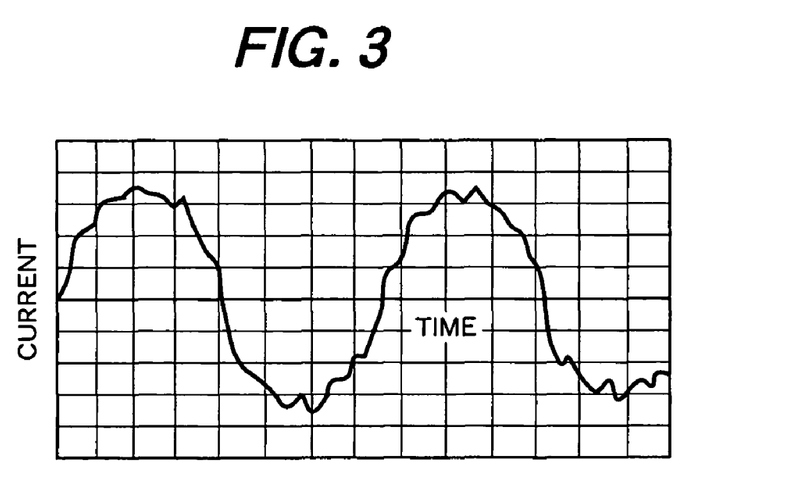
FIG. 3 is a current waveform diagram during inverter operation according to an embodiment of the invention.

Now, embodiments of the invention are to be described. FIG. 1 shows a radial cross sectional view of a permanent magnet type electric rotating machine according to an embodiment of the invention, and FIG. 2 shows an axial cross sectional view of the permanent magnet type electric rotating machine according to the embodiment of the invention. In the drawings, a stator comprises armature windings 4 with three U, V, W phases wound in a plurality of slots 3 formed in a stator core 2. The rotor 5 comprises an intermediate sleeve 10 to the outer periphery of a magnetic or non-magnetic shaft 6, an electromagnetic steel sheet or an amorphous ring 7 at the outer periphery of the intermediate sleeve 10, a permanent magnet 8 with a resistance of 0.3 mΩcm or more to the outer periphery of the electromagnetic steel sheet or amorphous ring 7, and a reinforcing member 9 comprising carbon fiber or amorphous to the outside of the permanent magnet 8. The rotor 5 is provided with the electromagnetic steel sheet or amorphous ring 7 to the outer periphery of the intermediate sleeve 10, the high resistance permanent magnet 8 and the reinforcing member 9 in this order as shown in FIG. 2, fixed to the end of the intermediate sleeve 10 by a sealing member 11, then magnetized for the high resistance permanent magnet 8, and then mounted to the shaft 6. The magnetic field necessary for the magnetization of the permanent magnet showing high resistance is 20 kOe in a case of an NdFeB matrix. The permanent magnet type electric rotating machine having the stator and the rotor 5 is rotationally driven by supplying a current from an inverter 12 by way of a reactor 13 to armature windings 4 in accordance with the magnetic pole position of the permanent magnet 8. The permanent magnet type electric rotating machine also includes those for driving vanes of air conditioning compressors, etc. and includes high speed machines with a number of rotation of 10,000 rpm or higher. In view of the relation with the driving frequency of the inverter, the motor has 2-poles in a high speed machine. Accordingly, the driving frequency is 167 Hz or higher. Since the current from the inverter at 167 Hz or higher is controlled for the application voltage by PWM (Pulse Width Modulation), higher harmonics are superimposed and, as a result of frequency analysis, 5 times, 7 times, 11 times, 13 times, 17 times, and 19 times the fundamental frequency are superimposed. FIG. 3 shows a current waveform during inverter operation according to the embodiment of the invention. Since the application voltage is controlled by PWM, other higher harmonic waves than the fundamental waves are superimposed as shown in FIG. 3 to form a distorted current waveform. 5th, 7th, 11th, 13th, 17th, and 19th are superimposed to the same waveforms. Since the current components of the odd number order are asynchronous with the rotational frequency, magnetic fluxes of higher harmonics are incident to the rotor. In a case where the resistance of the permanent magnet 8 is not high, current flows so as to offset higher harmonic magnetic fluxes to generate eddy current loss. The eddy current rises the temperature of the magnet and a magnet that changes the demagnetization curve depending on the temperature elevation is demagnetized and the effective magnetic fluxes are decreased. Accordingly, the output of the electric rotating machine is lowered. By increasing the resistance of the permanent magnet 8, the eddy current can be decreased to suppress the demagnetization. In the bond magnet, since a resin is used for the binder, the resistance is increased. However, the energy product is lowered due to the presence of the binder and it is difficult to ensure the reliability in a high temperature region of 150° C. or higher or in an atmosphere containing humidity or oil mists.

In the rare earth magnet, since rare earth elements are liable to be oxidized, anti-oxidation is not sufficient by the surface treatment with an organic material to the binder of the organic material or the magnetic powder, the magnet tends to be deteriorated, for example, by a brine spray test. Oxidation is prevented by forming the fluoro-containing layer to the surface of the magnetic powder instead of the surface treatment by an organic material. The thickness of the fluoro-containing layer is from 1 to 10,000 nm. A high resistance and less oxidizing magnet is obtained by molding a magnetic powder formed with the fluoro-containing layer using an organic binder. The resistance value is 15 mΩcm or higher at the magnetic powder volume ratio of 50 to 97%. Further, the resistance of a magnet not using the organic binder can be increased by molding a magnetic powder formed with the fluoro-containing layer at a temperature of 400° C. or higher, or coating the surface of the molded magnet with the fluoro-containing layer to laminate the magnet. For forming the fluoro-containing layer, it is possible to adopt a method of coating a gel-like fluoro-containing liquid, coating fine particles of a fluoro-containing compound of 1 to 100 nm, forming into a magnetic powder or a molded magnet by frame spraying or aerosol method, and forming to a magnetic powder or a molded magnet by vapor deposition, sputtering, CVD, PVD, etc. Since the fluoro-containing layer does not greatly deteriorate the magnetic property even when it is formed to the surface of the magnetic powder or the molding product providing that the working temperature range is lower than the curie temperature of the magnet, this is more effective for the magnet used at a higher temperature. A bulk magnet can be manufactured by depositing a powder for forming a magnet and a fluoro-containing powder to the surface of an amorphous or magnetic steel sheet of the rotor and directly forming a thick film magnet on the amorphous or electromagnetic steel sheet.

Table 1 shows a relation between the higher harmonic contents of the current in the invention and the elongation rate of the shaft.

according to the carrier frequency in PWM and the reactor. In view of Table 1, the shaft elongation ratio is less than the allowable value of 100% in the cases 1, 2, 3, 4, and 10. Among these cases, cases 1, 2, 3, and 10 satisfy the total content of 20.61% or less and A<C<B and B<20%. The conditions capable of providing a high speed permanent magnet electric rotating machine are: A<C<B and B<20%, and the total content of 20% or less. The total content of 20% or less may be controlled by adjusting the resistance of the reactor.

Figure 4:
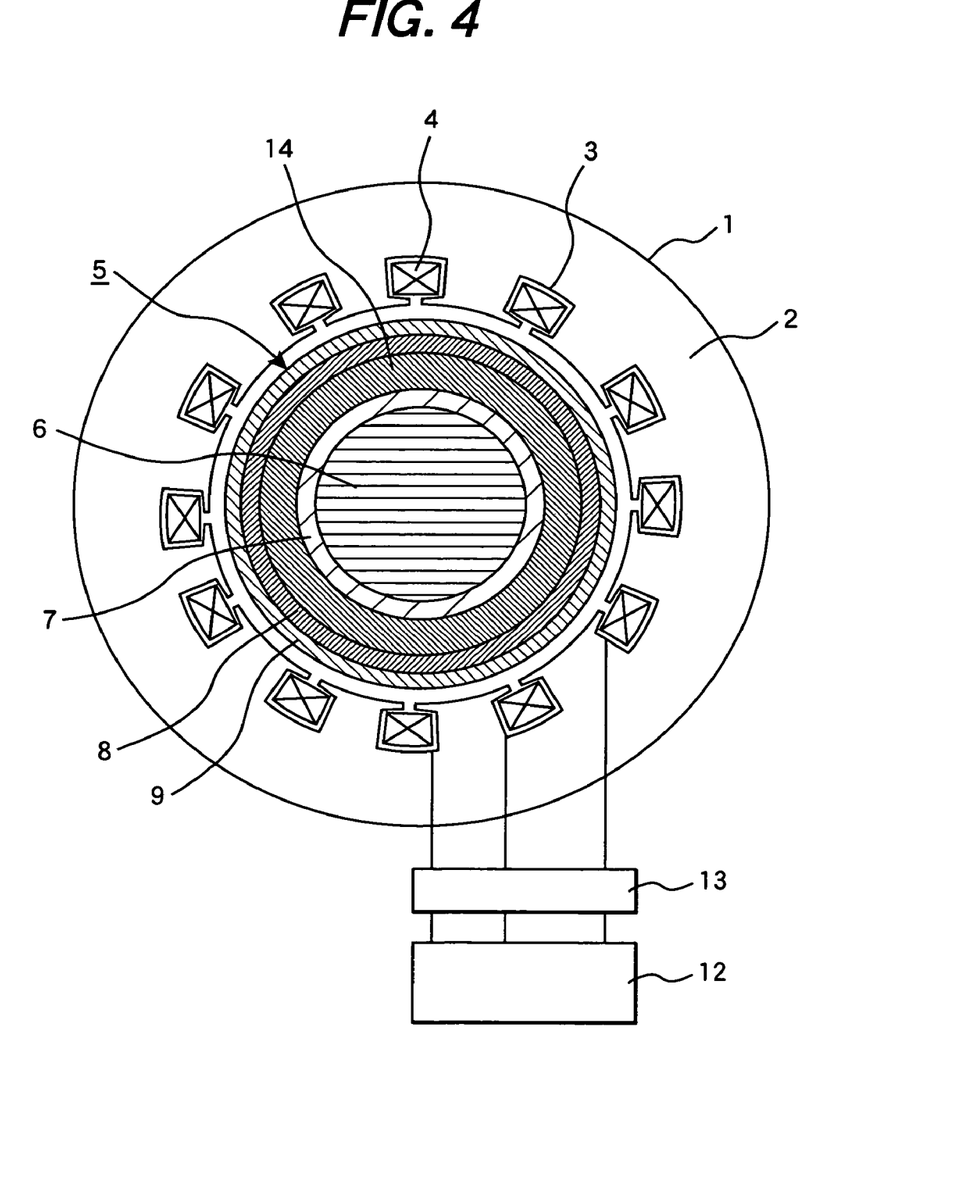
FIG. 4 is a radial cross sectional view of a permanent magnet type electric rotating machine according to another embodiment of the invention.

In FIG. 4, a rotor comprises armature windings 4 with three U, V, W phases wound in a plurality of slots 3 formed to a stator core 2. A rotor 5 comprises an intermediate sleeve 10 at the periphery of a magnetic or non-magnetic shaft 6, an electromagnetic steel sheet or amorphous ring 7 at the outer periphery of the intermediate sleeve 10, a low resistance magnet 14 having resistance of 0.1 to 0.2 mΩcm to the outer periphery of the electromagnetic steel sheet ring 7, a permanent magnet 8 having a resistance of 0.3 mΩcm or higher to the outside of the low resistance magnet 14, and a reinforcing member 9 comprising carbon fiber or amorphous to the outer side of the permanent magnet 8. The magnetic field necessary for the magnetization of the permanent magnet showing high resistance is 20 kOe in a case of an NdFeB matrix. The permanent magnet showing high resistance is disposed to the outer periphery of the low resistance magnet. Since the outer periphery is more liable to undergo the effect of the higher harmonic magnetic fields, only the outer periphery is formed of the high resistance magnet as a countermeasure to the eddy current loss. In a case of an outer rotor structure, since the inner periphery undergoes the effect of the higher harmonic magnetic fields, it is possible to make the resistance higher only for the magnet on the inner periphery. For other structures, the eddy current loss can be decreased by using the high resistance magnet only for the portion liable to undergo the effect of the higher harmonics also in the magnetic circuit. The permanent magnet type electric rotating machine having the stator 1 and the rotor 5 is rotationally driven by supplying a current from an inverter 12 by way of a reactor 13 to the armature windings 4 in accordance with the magnetic pole position of the permanent magnet 8. The permanent magnet

TABLE 1

| Case | | 1 | 2 | 3 | 4 | 5 | 6 | 7 | 8 | 9 | 10 |
|---|---|---|---|---|---|---|---|---|---|---|---|
| Order of hither harmonics | A: 5th | 1.6 | 1.4 | 2.5 | 8.6 | 7.5 | 9.5 | 5.5 | 3.9 | 8.7 | 4.1 |
| | B: 7th | 7.9 | 6.5 | 8 | 16.5 | 15.8 | 8.2 | 13.5 | 20.5 | 17.3 | 16.5 |
| | C: 11th | 4.5 | 3.7 | 5.5 | 6.7 | 8.6 | 4.3 | 4.8 | 5.9 | 5.9 | 6.9 |
| | D: 13th | 0.4 | 0.5 | 1.2 | 3.4 | 5.7 | 1.5 | 3.1 | 1.8 | 2.2 | 3.4 |
| | E: 17th | 2.9 | 3.5 | 2.8 | 5.5 | 8.5 | 5.4 | 1.6 | 2.8 | 4.1 | 5.5 |
| | F: 19th | 2.3 | 2.5 | 3.5 | 6.8 | 7.5 | 2.1 | 1.1 | 1.8 | 1.6 | 6.8 |
| Shaft elongation ratio (%) | | 34 | 71 | 94 | 115 | 135 | 102 | 103 | 121 | 109 | 98 |
| Total content (%) | | 9.95 | 8.75 | 11.05 | 21.89 | 23.26 | 14.55 | 15.78 | 22.01 | 20.83 | 20.61 |
| A < B | | ○ | ○ | ○ | ○ | ○ | X | X | ○ | ○ | ○ |
| A < C < B | | ○ | ○ | ○ | X | ○ | X | X | ○ | X | ○ |
| B < 20% | | ○ | ○ | ○ | ○ | X | ○ | ○ | X | ○ | ○ |

Table 1 shows the content of higher harmonic current for cases 1 to 10 using a permanent magnet type electric rotating machine at an output of 90 kW for the higher harmonic contents of A for 5th, B for 7th, C for 11th, D for 13th, E for 17th, and F for 19th, assuming the fundamental wave component being as 100%, as well as shows judgment of satisfaction for the elongation ratio of the shaft for each of the cases, assuming the allowable shaft elongation ratio being as 100%, relative to the total content calculated as $(A^2+B^2+C^2+D^2+E^2+F^2)^{0.5}$, A<B, A<C<B, and B<20% by the indication of "○" and "X". The higher harmonic content is controlled type electric rotating machine includes those for driving the vanes of air conditioning compressors, etc. and includes a high speed machine at the number of rotation of 10,000 rpm or more. In view of the relation with the driving frequency of the inverter, the motor has 2 poles in a high speed machine. Accordingly, the driving frequency is 167 Hz or higher. Since the current from the inverter at 167 Hz or higher is controlled for the application voltage by PWM (Pulse Width Modulation), higher harmonics are superimposed and, as a result of frequency analysis, 5 times, 7 times, 11 times, 13 times, 17 times, and 19 times the fundamental frequency are superimposed. Also in FIG. 4, conditions capable of attaining the permanent magnet electric rotating machine are satisfied in a case where A<C<B, B<20%, and the total content is 20% or less.

Figure 5:
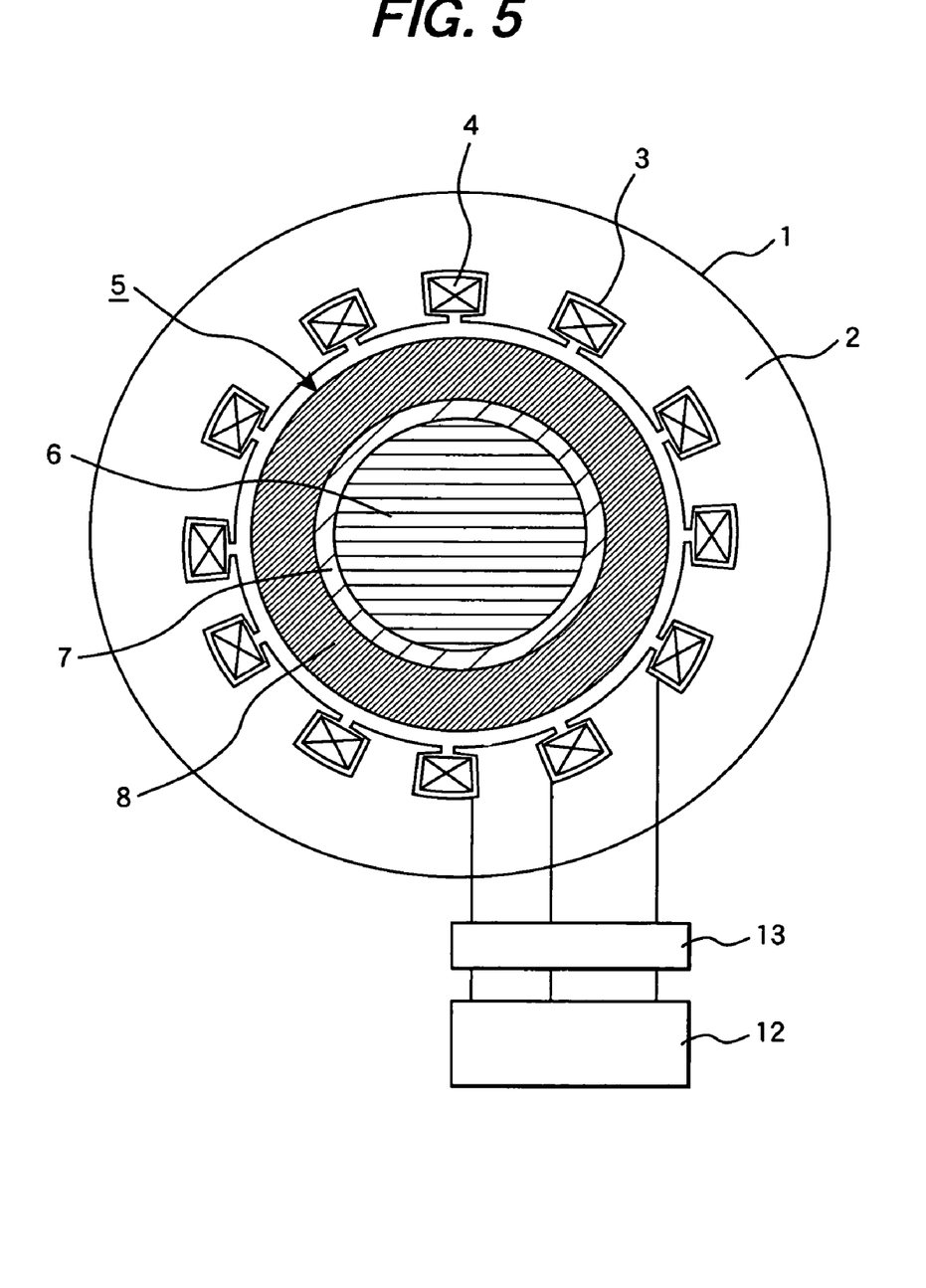
FIG. 5 is a radial cross sectional view of a permanent magnet type electric rotating machine according to other embodiment of the invention.

In FIG. 5, a stator comprises armature windings 4 with three U, V, W phases wound in a plurality of slots 3 formed to a stator core 2. The rotor 5 comprises an intermediate sleeve 10 to the outer periphery of a magnetic or non-magnetic shaft 6, an electromagnetic steel sheet or Fe amorphous ring 7 to the outer periphery of the intermediate sleeve 10, and a permanent magnet 8 having a resistance of 0.3 mΩcm or more to the outer periphery of the ring 7. Magnetic field necessary for magnetization of the permanent magnet showing high resistance is 20 kOe in a case of an SmCo matrix. The permanent magnet showing high resistance is disposed to the outer periphery of a low resistance magnet. The high resistance magnet is used as a countermeasure to the eddy current loss in the magnet portion liable to undergo the effect of the higher harmonic magnetic fields. In a case of low speed rotation, as shown in FIG. 5, there is no particular requirement for reinforcing the outside of the high resistance magnet. The permanent magnet type electric rotating machine comprising the stator and the rotor 5 is rotationally driven by supplying a current from an inverter 12 by way of a reactor 13 to armature windings 4 in accordance with the magnetic pole position of a permanent magnet 8. The permanent magnet type electric rotating machine includes a electric rotating machine with the number of rotation of 10,000 rpm or less. Such a motor has three or more poles. Accordingly, higher harmonics are also superimposed to the driving frequency while this depends on the number of poles. As a result of frequency analysis, 5 times, 7 times, 11 times, 13 times, 17 times, and 19 times the fundamental frequency are superimposed as the superimposed higher harmonics. Also in the case of FIG. 5, the optimal conditions capable of providing the permanent magnet electric rotating machine are satisfied in a case where A<C<B and B<20%, and the total content is 20% or less.

Figure 6:
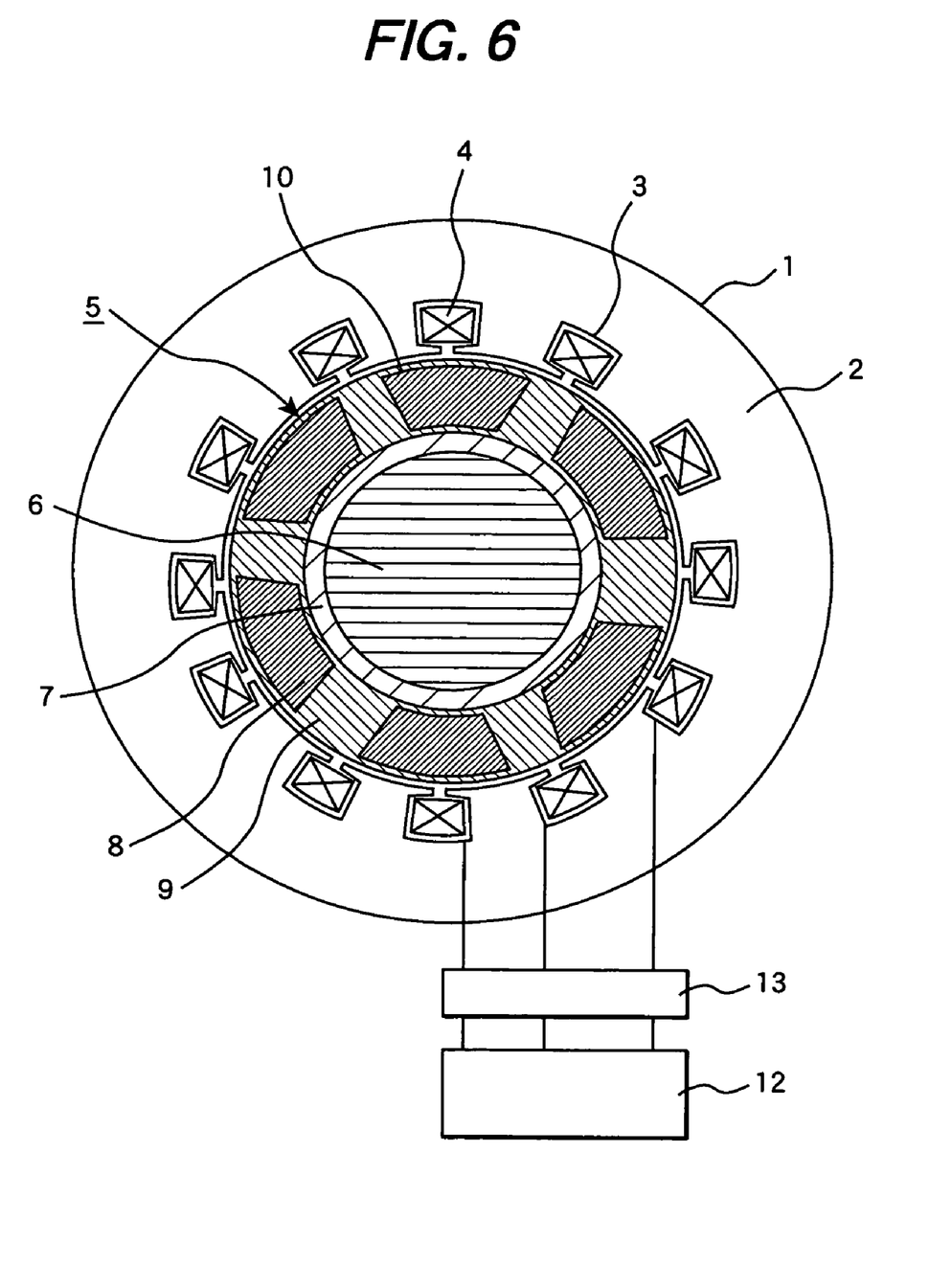
FIG. 6 is a radial cross sectional view of a permanent magnet type electric rotating machine according to a further embodiment of the invention.

In FIG. 6, a stator comprises armature windings 4 with three U, V, W phases wound in a plurality of slots 3 formed to a stator core 2. A rotor 5 comprises an intermediate sleeve 10 at the outer periphery of a magnetic or non-magnetic shaft 6, an electromagnetic steel sheet or an Fe amorphous ring 7 to the outer periphery of the intermediate sleeve 10, and a permanent magnet having a resistance of 0.3 mΩcm or higher to the outer periphery of the amorphous ring 7, between each of reinforcing members 9 made of a soft magnetic material such as laminated steel sheets, powder magnetic core or laminated amorphous layers, as shown in FIG. 6. The surface magnetic flux density is made higher to obtain higher torque in a case where the soft magnetic material is not present to the outside of the permanent magnet 8. For the permanent magnet 8, a bond magnet comprising a magnetic powder containing a fluoro-containing high resistance layer and a resin can be applied. In a case of the bond magnet, the magnetic powder may be isotropic, anisotropic or a mixture of isotropic and anisotropic powder. Further, also the molding method may be any of compression, extrusion and injection molding. In a case of the anisotropic powder, anisotropic property such as radial anisotropy or polar anisotropy can be provided by using an NdFeB magnetic powder, an SmCo anisotropic magnetic powder, or an SmFeN anisotropic magnetic powder such as an HDDR powder or high temperature modified magnetic powder by application of magnetic fields during molding. The fluoro-containing high resistance layer is from 1 to 10,000 nm and the resistance of the high resistance layer is 10 mΩcm or higher. The high resistance layer is stable at 200° C. and does not deteriorate the magnetic property of a powder containing Fe, Co, Ni, Mn, etc. Also in a case of the NdFeB magnet or SmCo magnet, since the fluoro-containing high resistance layer is stable up to high temperature, it is durable also in the use at 200° C. to 400° C. In a case of using a molded magnet, a fluorine compound high resistance layer is coated by using a sol solution after machining and polishing an NdFeB sintered magnet or SmCo sintered magnet block. Ni, etc. may also be plated before or after coating. The thus coated and formed high resistance layer is applied with a heat treatment for reducing defects and pinholes, formed into a multi-layered structure, and the preparation condition for the sol solution, and the structure and the diameter of fine particles in the sol solution are optimized. The thickness of the high resistance layer between the blocks is from 1 to 1,000 nm. The fluoro-containing high resistance layer can be used also for increasing the resistance of the reinforcing material 9. The surface of a plate or powder of magnetic material, an amorphous thin ribbon, a powder or thin ribbon in a quasi-stable phase with addition of Fe, Co, Ni or an alloy thereof, and various third and fourth elements is coated with a fluoro-containing high resistance layer. In the same manner as described above, the sol-like solution is coated, heated and dried to form a fluoro-containing layer on the surface of the powder or thin ribbon. A fluoro-containing powder is sprayed and deposited to the surface of a magnetic powder or thin magnetic ribbon by using an aerosol method to form a fluoro-containing high resistance layer. Since the high resistance layer has heat resistance, after forming the high resistance layer, it is heat-molded at a temperature of 1000° C. or lower to obtain a soft magnetic material of high density and high resistance. Accordingly, when the combination of the reinforcing material 9 and the permanent magnet 8 is described as soft magnetic material-permanent magnet, such combination includes soft magnetic material having fluoro-containing high resistance layer-permanent magnet having fluoro-containing high resistance layer, soft magnetic material having a high resistance layer not containing fluorine-permanent magnet having a fluoro-containing high resistance layer, and a soft magnetic material having a fluoro-containing high resistance layer-permanent magnet having a high resistance layer not including fluorine. The permanent magnet type electric rotating machine comprising the stator and the rotor 5 is rotationally driven by supplying a current from an inverter 12 by way of a reactor 13 to armature windings 4 in accordance with the magnetic pole positions of the permanent magnet 8. The magnetic material having a high resistance fluoro-containing layer can also be applied to the reactor to decrease the loss. The permanent magnet type electric rotating machine includes those electric rotating machines with the number of rotation of less than 10,000 rpm. Such a motor has three or more magnetic poles. Accordingly, for the driving frequency, higher harmonics are also superimposed while depending on the number of poles. As a result of frequency analysis, higher harmonics of 5 times, 7 times, 11 times, 13 times, 17 times, and 19 times the fundamental frequency are superimposed. Also in FIG. 6, optimal conditions capable of providing the permanent magnet electric rotating machine are satisfied in a case where A<C<B, B<20%, and the total content is 20% or less. Under the optimal conditions, control by the reactor is easier than in the usual case and inexpensive reactor can be used.

In the permanent magnet type electric rotating machine of applying the high resistance magnet to the motor as described above, the content of the higher harmonic current component supplied from the inverter for driving the permanent magnet type synchronous motor for the 5th content A, the 7th content B, the 11th content C is controlled such that the 7th content B is 20% or less and the relation: A<C<B is satisfied assuming the fundamental wave component being as 100% by controlling the higher harmonic current component supplied from the invention by using the reactor. This can greatly decrease the higher harmonic loss.

In the embodiment described above, by the incorporation of the fluoride in the permanent magnet, the eddy current loss caused inside the permanent magnet can be decreased to effectively improve the efficiency of the electric rotating machine.

Figure 7:
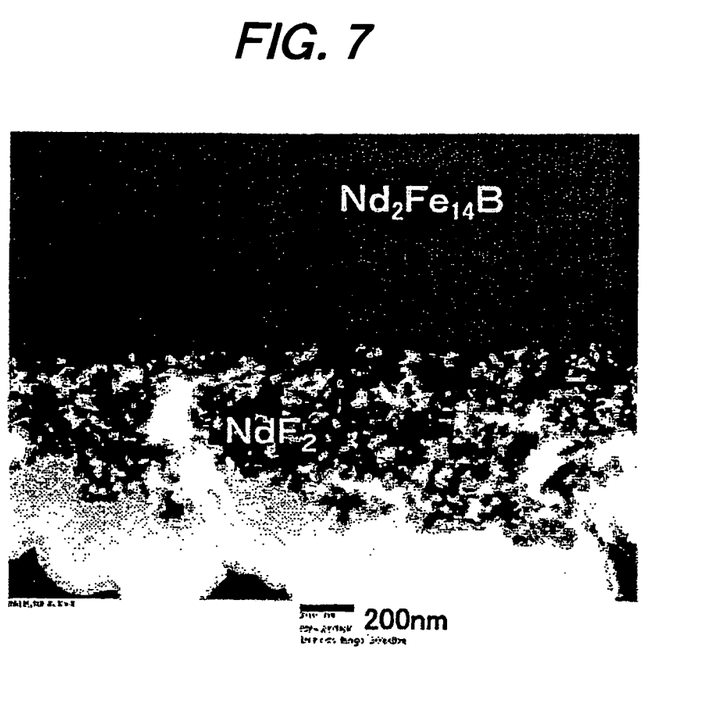
FIG. 7 is a photograph observed by cross sectional TEM of a magnetic powder for a magnet used in a permanent magnet type electric rotating machine according to the embodiment of the invention.
Figure 8:
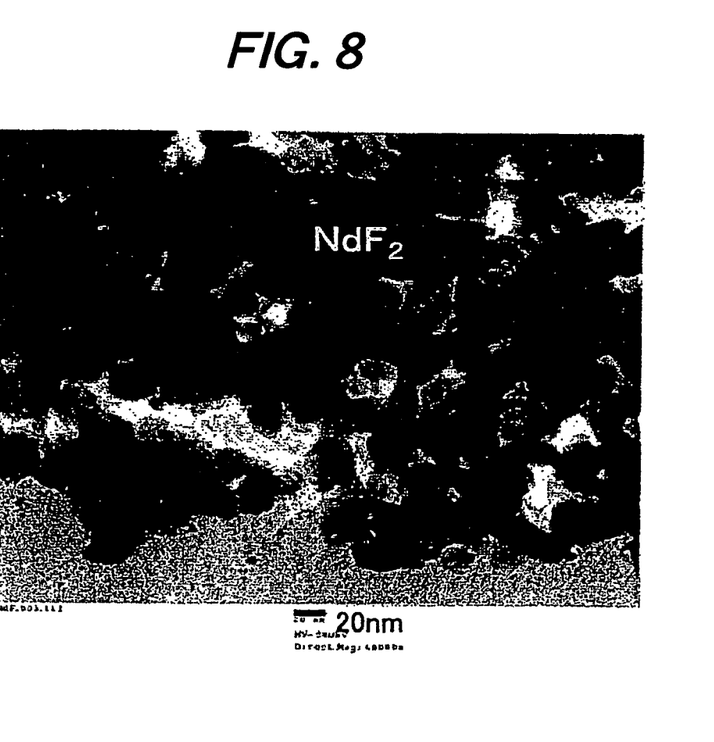
FIG. 8 is a photograph observed by cross sectional TEM of a magnetic powder for a magnet used in a permanent magnet type electric rotating machine according to other embodiment of the invention.

A method of manufacturing a permanent magnet used in the permanent magnet type electric rotating machine described above is to be described specifically. In the first example, a powder with a powder grain size of 1 to 100 µm comprising $Nd_2Fe_{14}B$ as a main phase is used as the magnetic powder, and a film comprising crystalline or amorphous $NdF_3$ as the main ingredient is formed by using $NdF_3$ gelled by a solvent to the surface of the magnetic powder partially or entirely. In a case of coating to the magnetic powder, a solvent less giving magnetic or structural damages to the magnetic powder is used selectively. The thickness of the thus coated and formed $NdF_3$ film is 1 to 10,000 nm in average. Mixing of $NdF_2$ in $NdF_3$ gives no undesired effects on the magnetic property of the magnetic powder. Near the boundary between the fluoride layer and the magnetic powder, an oxide that contains a rare earth element and a carbon or oxygen-containing compound as a trace amount of impurity may be present. FIG. 7 and FIG. 8 show the result of cross sectional TEM observation in a case of forming $NdF_2$ to the powder comprising $Nd_2Fe_{14}B$ as the main phase. FIG. 7 shows TEM images near the interface between $Nd_2Fe_{14}B$ and $NdF_2$. No significant damages were recognized on the side of $Nd_2Fe_{14}B$ by the formation of $NdF_2$. In view of FIG. 7 and FIG. 8, it can be seen that the grain size of $NdF_2$ formed to $Nd_2Fe_{14}B$ is from 10 to 20 nm. The grain size and the density of the fluoride film can be controlled depending on the manufacturing conditions for the gel and coating and heat treatment conditions in which particles are grown by a heat treatment at 400° C. or higher to decrease the density of defects. Those which can be used in the same gelled state as that of the $NdF_2$ fluoride compound are $BaF_2$, $CaF_2$, $MgF_2$, $SrF_2$, LiF, $LaF_3$, $NdF_3$, $PrF_3$, $SmF_3$, $EuF_3$, $GdF_3$, $TbF_3$, $DyF_3$, $CeF_3$, $HoF_3$, $ErF_3$, $TmF_3$, $YbF_3$, $LuF_3$, $LaF_2$, $NbF_2$, $PrF_2$, $SmF_2$, $EuF_2$, $GdF_2$, $TbF_2$, $DyF_2$, $CeF_2$, $HoF_2$, $ErF_2$, $TmF_2$, $YbF_2$, $LuF_2$, $YF_3$, $ScF_3$, $CrF_3$, $MnF_2$, $MnF_3$, $FeF_2$, $FeF_3$, $CoF_2$, $CoF_3$, $NiF_2$, $ZnF_2$, AgF, $PbF_4$, $AlF_3$, $GaF_3$, $SnF_2$, $SnF_4$, $InF_3$, $PbF_2$, $BiF_3$, and $BiF_3$, or a composite fluorine compound formed by mixing two or more of the fluorine compounds, a fluorine compound laminate formed by laminating two or more of the fluorine compounds, or a fluorine compound represented by MxFy in which M represents one or plurality of metal elements and x represents 1 to 5, and y represents 1 to 10 in the composition. A light element such as oxygen, carbon, nitrogen, or boron may be mixed to a portion of F, or a fluoride represented by MxFyOz in which M represents one or plurality of metal elements, x is from 1 to 5, y is from 1 to 10, O is oxygen and Z represents from 1 to 10 in the composition. Alternatively, by forming at least one of amorphous fluorine compound containing ingredient having an identical composition with the fluoro-containing compounds or alloys described above on the surface of the powder comprising $Nd_2Fe_{14}B$ as the main phase, it is possible to obtain one of the effects of decreasing the temperature coefficient of coercivity, increasing the coercivity, decreasing of the temperature coefficient or increasing Hk of the residual magnetic flux density, improving the squareness of the demagnetization curve, improving for the corrosion resistance, suppressing of oxygen, increasing of the tensile strength, suppressing the brittle destruction or improving the high temperature strength. The fluorides described above may be either ferromagnetic or non-magnetic at 20° C. When the gel is used and coated on the magnetic powder, coverage of the fluoride on the surface of the magnetic powder can be increased more than that in the case of mixing with the fluoride powder without using the gel. Accordingly, the effect described above develops more conspicuously in the case of coating using the gel than in the case of mixing with the fluoride powder. The effect described above can be maintained also in a case where oxygen and constituent elements of the matrix are contained in the fluoride. A bond magnet can be molded by preparing a compound mixing the magnetic powder formed with the fluoride layer with an organic resin such as epoxy resin, polyimide resin, polyamide resin, polyamideimide resin, kerimide, maleimide, polyphenyl ether, polyphenylene sulfide used alone or epoxy resin, polyamide resin, polyamideimide resin, kerimide resin and maleimide resin as a mixture thereof, and the molding the same under magnetic field or non-magnetic field. For the bond magnet using the $Nd_2Fe_{14}B$ powder coated with the gel described above, it can be confirmed one of the effects of decreasing the temperature coefficient of coercivity, increasing the coercivity, decreasing of the temperature coefficient or increasing of Hk of the residual magnetic flux density, improving the squareness of the demagnetization curve, improving the corrosion resistance or suppressing oxidation. It is considered that the effects are attributable to the stabilization of the magnetic domain structure, increase of the anisotropy near the fluoride and prevention of oxidation of the magnetic powder with the fluoride due to formation of the fluoride layer.

As other example, a magnetic powder comprising $Nd_2Fe_{14}B$, $Sm_2Fe_{17}N_3$, or $Sm_2Co_{17}$ as the main phase, or an alloy powder of a rare earth element and Fe, Co, or Ni with a particle size of 1 to 100 µm is used for the magnetic powder and a crystalline or amorphous film comprising $REF_3$ as the main ingredient is coated and formed by using a gelled product containing $REF_3$ (RE: rare earth element) to the surface of the magnetic powder partially or entirely. The thickness of the $REF_3$ film is from 1 to 10,000 nm on average. Even when $REF_2$ is mixed with $REF_3$, it gives no undesired effects on the magnetic property of the magnetic powder. The solvent used for the preparation of the gel is removed after coating. A rare earth-rich phase comprising an oxide that contains a rare earth element and a carbon or oxygen-containing compound as a trace amount of impurity may be present near the boundary between the fluoride layer and the magnetic powder. The composition of the fluoride layer can be varied by controlling the composition or the coating condition of the gel within the range of $REF_X$ (X=1 to 3). By forming at least one crystalline fluorine compound containing ingredient or amorphous compound having a similar composition to the surface of the magnetic powder, it is possible to obtain one of the effects of decreasing the temperature coefficient of coercivity, increasing the coercivity, decreasing the temperature coefficient or increasing Hk of the residual magnetic flux density, improving the squareness of the demagnetization curve, improving the corrosion resistance, or suppressing oxidation. A bond magnet can be molded by preparing a compound formed by mixing the magnetic powder formed with the fluoride layer with an organic resin such as an epoxy resin, polyimide resin, polyamide resin, polyamideimide resin, kerimide resin, maleimide resin, polyphenylene ether, polyphenylene sulfide each used alone or epoxy resin, polyamide resin, polyamideimide resin, kerimide resin, and maleimide resin as a mixture, and compression molding or injection molding them. Alternatively, a molded magnet with the magnetic powder volume ratio of 80 to 99% can be prepared by compression molding, heat molding or extrusion molding of the magnetic powder formed with the fluoride layer using a die. In the molded magnet, a layered fluoride is formed in the grain boundary. For the bond magnet using an $Nd_2Fe_{14}B$, $Sm_2Fe_{17}N_3$ or $Sm_2Co_{17}$ powder coated with the gel, it is possible to confirm one of the effects of decreasing the temperature coefficient of coercivity, increasing the coercivity, decreasing the temperature coefficient or increasing Hk of the residual magnetic flux density, improving the squareness of the demagnetization curve, improving the corrosion resistance or suppressing oxidation in the same manner as the effect of the magnetic powder. While various elements are added respectively to the $Nd_2Fe_{14}B$, $Sm_2Fe_{17}N_3$ or $Sm_2Co_{17}$ powder in view of application use, fluoride can be formed in a case of using any of the additive elements described above and the effect can be confirmed. Further, the tissue, the crystal structure, the grain boundary, the grain size, etc. of the $Nd_2Fe_{14}B$, $Sm_2Fe_{17}N_3$ or $Sm_2Co_{17}$ magnetic powder are controlled by adding metal elements including rare earth elements. For this purpose, other phase than the main phase is also formed by the additive elements or the magnet preparing process. NdFeB system includes boride and, rare earth-rich phase or iron-rich phase and the gelled product can be coated also to the surface of the powder of the phase formed with the phase and the oxide, and a layered fluoride can be formed.

As other example, improvement of corrosion resistance or increase of the electric resistance can be attained by forming at least one of $BaF_2$, $CaF_2$, $MgF_2$, $SrF_2$, $LiF$, $LaF_3$, $NdF_3$, $PrF_3$, $SmF_3$, $EuF_3$, $GdF_3$, $TbF_3$, $DyF_3$, $CeF_3$, $HoF_3$, $ErF_3$, $TmF_3$, $YbF_3$, $LuF_3$, $LaF_2$, $NbF_2$, $PrF_2$, $SmF_2$, $EuF_2$, $GdF_2$, $TbF_2$, $DyF_2$, $CeF_2$, $HoF_2$, $ErF_2$, $TmF_2$, $YbF_2$, $LuF_2$, $YF_3$, $ScF_3$, $CrF_3$, $MnF_2$, $MnF_3$, $FeF_2$, $FeF_3$, $CoF_2$, $CoF_3$, $NiF_2$, $ZnF_2$, $AgF$, $PbF_4$, $AlF_3$, $GaF_3$, $SnF_2$, $SnF_4$, $InF_3$, $PbF_2$, and $BiF_3$, to the surface of the magnetic material that contains at least one rare earth element. The fluoro-containing compound is formed by treating the surface of the sintered material comprising $Nd_2Fe_{14}B$ as the main phase at a temperature of 100° C. or higher after coating the fluoro-containing gel. The thickness of the fluoro-containing layer is from 1 to 10,000 nm. A fluoro-containing layer at a thickness of 1 nm or more and with a resistivity of $1 \times 10^4$ Ωcm or higher is obtained. Since the film is stable at 1000° C. or lower, it is possible to prevent oxidation of the magnet material used at high temperature. Making the fluoride layer into a multi-layered structure, lamination of a metal film (Ni, Cr, Cu, etc.) and a fluorine compound film, lamination of a fluoride-containing film and an oxide, or lamination of a fluoride-containing film and an organic material for decreasing pinholes is also effective for ensuring the corrosion resistance or increasing the resistance. Light elements such as oxygen, nitrogen or boron may also be incorporated in the fluoride compound grown to the fluoro-containing layer. A film mainly comprising $NdF_3$ can be formed by coating $NdF_3$ as a gel to the $Nd_2Fe_{14}B$ molding product, and applying a heat treatment at a temperature of 100° C. or higher. The film has a thickness of 1 to 10,000 nm and shows a resistance value of $1 \times 10^4$ Ωcm or higher. Further, when a heat treatment is applied at 400° C. or higher, $NdF_2$ grows near the boundary with $Nd_2Fe_{14}B$. $NdF_2$ makes the layer less peeling and further increase the resistance value. Also in a case where an Ni film is present on the surface of the molding material, $NdF_3$ can be formed in the same manner and a film showing a resistance value of $1 \times 10^4$ Ωcm or higher is obtained and the resistance of the molded magnet can be increased to 0.3 mΩcm or higher.

As other example, a magnetic circuit is prepared by using $Nd_2Fe_{14}B$ as a hard magnetic material and Fe as a soft magnetic material. An Fe powder is inserted to the periphery of $Nd_2Fe_{14}B$ provisionally molded in a die and molded at a press pressure of 1 t/cm² or more. The powders have been coated at the surface with a fluoro-containing material. After pressing, heating is applied in a heat treatment furnace to bond the coat layers to each other. The temperature is from 500° C. to 1200° C. Diffusion is formed at the fluoride and the fluoride at the surface of $Nd_2Fe_{14}B$ and Fe powders are bonded and integrated. The fabrication after the integration is different depending on the design of a magnetic circuit intended to be used and, due to the presence of the coat material, this gives an advantageous feature that the corrosion resistance is high and the eddy current loss is small even when $Nd_2Fe_{14}B$ is present on the surface. Materials capable of heat molding the hard magnetic material and the soft magnetic material by using the fluoride described above includes rare earth-3d transition metal series or rare earth-3d transition metal-semi metal series as the SmFeN series and Fe series, FeCo series, Fe—Si series, Fe—C series, Ni series, Fe—Ni series, etc. as the soft magnetic material. Metal series magnetic powders containing at least one of rare earth elements other than those in Example 7 change the magnetic property since the rare earth elements are liable to be oxidized. The fluoride is effective as a layer for preventing oxidation of rare earth elements. The fluoride layer used in the example described above can be expected to have an anti-oxidation effect for all of metal series magnetic powders including the rare earth elements and can provide an effect in view of the suppression of corrosion, suppression of collapse, and stability of corrosion potential.

As other example, a mother alloy comprising a rare earth element, iron and boron is melted in vacuum, and pulverized coarsely and finely in an inert gas to obtain a powder with an average grain size of 0.1 to 10 μm. The shape of the powder may be spherical, amorphous or tabular. A solution containing a gelled fluorine compound is coated to the powder. The solvent is restricted in view of the kind of the impurity and the content of the impurity so as to suppress oxidation of the powder. A solution in an amount calculated based on the weight of the powder is used and coated to the powder. After coating, the solvent is removed by heat treatment. When $DyF_3$ is coated by 100 nm in average and heat treated in vacuum at a temperature of 500° C., a portion of $DyF_3$ is transformed to $DyF_2$. Growth of $DyF_2$ changes the magnetic property on the surface of the powder and, as a result, improves the squareness of the demagnetization curve and increases the residual magnetic flux density. Also in a case of an $Sm_2Co_{17}$ magnetic powder, the squareness of the demagnetization curve is improved by applying a heat treatment which results in the structural change from $DyF_3$ to $DyF_2$.

As other example, a rare earth element and iron or cobalt are melted in vacuum and pulverized coarsely and finely in an inert gas and a powder with a grain size of 0.1 μm or less is obtained by using a ball mill or the like. The ball milling is conducted under the condition at a room temperature, at a number of rotation from 500 to 1000 rpm in alcohol while using fluoride coated balls. A rare earth iron powder is coated with $DyF_3$ before ball milling. The thickness of the coating film is 1/10 or less of the average size of the magnetic powder. By ball milling the coated magnetic powder, a rare earth-iron fluoride compound is formed. Such a rare earth-iron fluoride compound contains from 1 to 10 atom % of fluorine and has a magnetic characteristic with the coercivity of 10 kOe or more and a residual magnetic flux density of 0.5 T to 1.2 T. The magnetic powder containing the rare earth iron fluorine compound described above can be used as the raw material for the bond magnetic and a permanent magnet showing a resistivity of 0.3 mΩcm or higher can be obtained.

As other example, after coating a film of 1 to 1000 nm thickness containing a fluorine compound such as $BaF_2$, $CaF_2$, $MgF_2$, $SrF_2$, LiF, $LaF_3$, $NdF_3$, $PrF_3$, $SmF_3$, $EuF_3$, $GdF_3$, $TbF_3$, $DyF_3$, $CeF_3$, $HoF_3$, $ErF_3$, $TmF_3$, $YbF_3$, $LuF_3$, $LaF_2$, $NbF_2$, $PrF_2$, $SmF_2$, $EuF_2$, $GdF_2$, $TbF_2$, $DyF_2$, $CeF_2$, $HoF_2$, $ErF_2$, $TmF_2$, $YbF_2$, $LuF_2$, $YF_3$, $ScF_3$, $CrF_3$, $MnF_2$, $MnF_3$, $FeF_2$, $FeF_3$, $CoF_2$, $CoF_3$, $NiF_2$, $ZnF_2$, AgF, $PbF_4$, $AlF_3$, $GaF_3$, $SnF_2$, $SnF_4$, $InF_3$, $PbF_2$, and $BiF_3$, to a magnetic powder such as NdFeB series, SmFeN series, or SmCo series, the magnetic powder is formed into an aerosol and deposited on a releasable material thereby capable of forming a magnetic powder. The thickness of the film obtained by optimizing the gas flow rate, the deposition rate, and the spraying speed is within a range from 100 μm to 10,000 μm. $Nd_2Fe_{14}B$ with the 10% by volume or less of fluorine compound can form a thick film with the coercivity of 10 kOe to 35 kOe, the residual magnetic flux density of 0.6 to 1.2 T and the resistivity of 1 mΩcm to 100 mΩcm, and the magnetic powder with a powder diameter of 1 to 500 μm obtained by pulverizing the same shows substantially the same characteristics. By the use of an aerosol process, the fluoro-containing film can be formed on the surface of the molded magnet and the surface of the molded magnet can be coated with less releasable high resistance film. The $Nd_2Fe_{14}B$ powder formed by coating the magnetic powder prepared by way of the aerosol process in a coating process mainly using the fluorine compound shows high resistance at a temperature of 500° C. or lower and the corrosion resistance is also improved compared with the not-coated powder.

What is claimed is:

1. A permanent magnet electric rotating machine comprising a stator core wound with windings and a rotor having a permanent magnet and rotatably supported to the stator core, wherein:

the permanent magnet comprises a magnetic powder having powder grains which are coated with a fluoro-containing compound of at least one of an alkaline earth metal and a rare earth metal; and a current supplier which supplies the windings with current in which the contents of fundamental wave components of the current supplied to the windings is controlled so that the content A of the 5th higher harmonic component, the content B of the 7th higher harmonic wave component, and the content C of the 11th higher harmonic wave component are A<C<B and B is 20% or less, assuming the total of the contents of the fundamental wave components being 100%.

2. A permanent magnet electric rotating machine including a stator core wound with windings and a rotor having a permanent magnet and rotatably supported to the stator core, wherein:

the permanent magnet comprises a magnetic powder having powder grains which are coated with a fluoro-containing compound of at least one of an alkaline earth metal and a rare earth metal; and a current supplier which supplies the windings with current in which the contents of fundamental wave components of the current supplied to the windings is controlled so that the content A of the 5th higher harmonic component, the content B of the 7th higher harmonic component, the content C of the 11th higher harmonic component, the content D of the 13th higher harmonic component, the content E of the 17th higher harmonic component, and the content F of the 19th higher harmonic component satisfy $(A^2+B^2+C^2+D^2+E^2+F^2)^{0.5}$, and B is 20% or less of the total content, assuming the total of the basic wave components being 100%.

3. A permanent magnet electric rotating machine according to claim 1, wherein the magnetic powder comprises grains of NdFeB, SmCo, or SmFeN, the fluoro-containing compound is coated on the surface of the grains of the magnetic powder.

4. A permanent magnet electric rotating machine according to claim 2, wherein the magnetic powder comprises grains of NdFeB, SmCo, or SmFeN, and the fluoro-containing compound is coated on the surface of the grains of the magnetic powder.

5. A permanent magnet electric rotating machine comprising a stator core wound around with windings and a rotor having a permanent magnet and rotatably supported to the stator core, wherein:

the powder grains of the permanent magnet is a ferromagnetic material;

the coating of the powder grains includes a first layer containing the fluoro-containing compound of the at least one of the alkaline earth metal and the rare earth metal and a fluorine formed to a portion of a grain boundary or near a surface of the powder of the ferromagnetic material; and a second layer containing the fluoro-containing compound of at least one of the rare earth metal, having a fluorine concentration lower than that of the first layer and having a rare earth metal concentration higher than that of the matrix of the ferromagnetic material, or an oxide layer containing the rare earth metal formed in adjacent with a portion of the first layer.

6. A permanent magnet electric rotating machine according to claim 1, wherein:

the powder grains of the permanent magnet is a ferromagnetic material;

the coating of the powder grains includes a first layer containing the fluoro-containing compound of the at least one of the alkaline earth metal and the rare earth metal and a fluorine formed to a portion of a grain boundary or near a surface of the powder of the ferromagnetic material; and a second layer containing the fluoro-containing compound of at least one of the rare earth metal, having a fluorine concentration lower than that of the first layer and having a rare earth metal concentration higher than that of the matrix of the ferromagnetic material, or an oxide layer containing the rare earth metal formed in adjacent with a portion of the first layer.

7. A permanent magnet electric rotating machine according to claim 2, wherein:

the powder grains of the permanent magnet are a ferromagnetic material;

the coating of the powder grains includes a first layer containing the fluoro-containing compound of the at least one of the an alkaline earth metal and the rare earth metal and a fluorine formed to a portion of a grain boundary or near a surface of the powder of the ferromagnetic material; and a second layer containing the fluoro-containing compound of at least one of the rare earth metal, having a fluorine concentration lower than that of the first layer and having a rare earth metal concentration higher than that of the matrix of the ferromagnetic material, or an oxide layer containing the rare earth metal formed in adjacent with a portion of the first layer.

8. A permanent magnet electric rotating machine according to claim 1, wherein
a resistivity of the permanent magnet is 0.3 mΩcm or more.

9. A permanent magnet electric rotating machine according to claim 2, wherein
a resistivity of the permanent magnet is 0.3 mΩcm or more.

10. The permanent magnet electric rotating machine according to claim 1, wherein the magnetic powder comprises a rare earth metal.

11. The permanent magnet electric rotating machine according to claim 2, wherein the magnetic powder comprises a rare earth metal.

12. The permanent magnet electric rotating machine according to claim 1, wherein the magnet powder comprises a hard magnetic powder containing a rare earth metal.

13. The permanent magnet electric rotating machine according to claim 2, wherein the magnet powder comprises a hard magnetic powder containing a rare earth metal.

14. The permanent magnet electric rotating machine according to claim 1, wherein coating of the fluoro-containing compound has a thickness of 1 to 10,000 nm on average.

15. The permanent magnet electric rotating machine according to claim 1, wherein coating of the fluoro-containing compound has a thickness of 1 to 10,000 nm on average.

16. The permanent magnet electric rotating machine according to claim 1, wherein a grain size of the magnetic powder is 1 to 100 μm.

17. The permanent magnet electric rotating machine according to claim 2, wherein a grain size of the magnetic powder is 1 to 100 μm.

* * * * *